H. H. SOUTHWORTH.
CONTROLLING DEVICE FOR REFRIGERATING APPARATUS.
APPLICATION FILED JUNE 11, 1914.
1,162,318.
Patented Nov. 30, 1915.
2 SHEETS—SHEET 2.
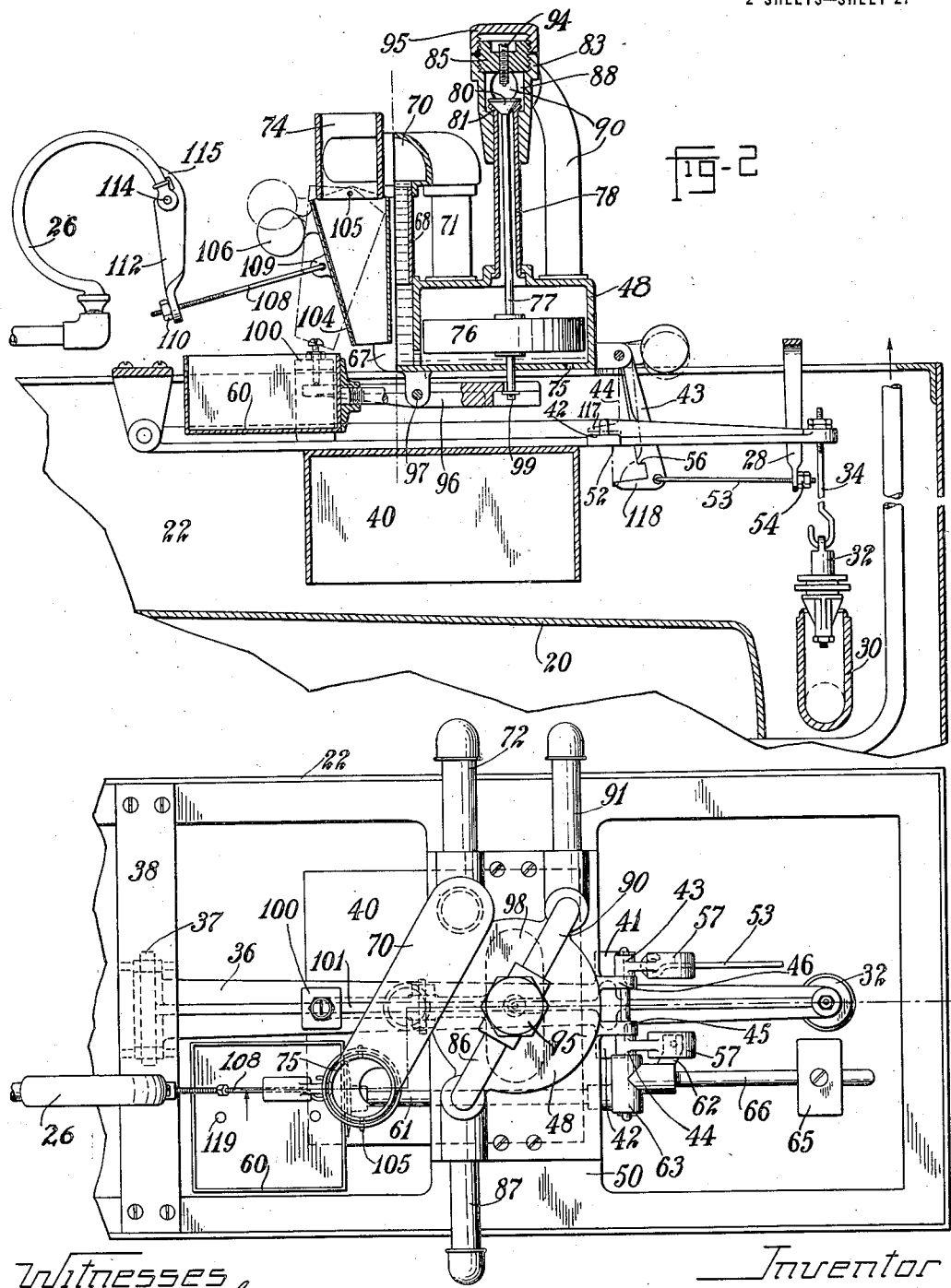

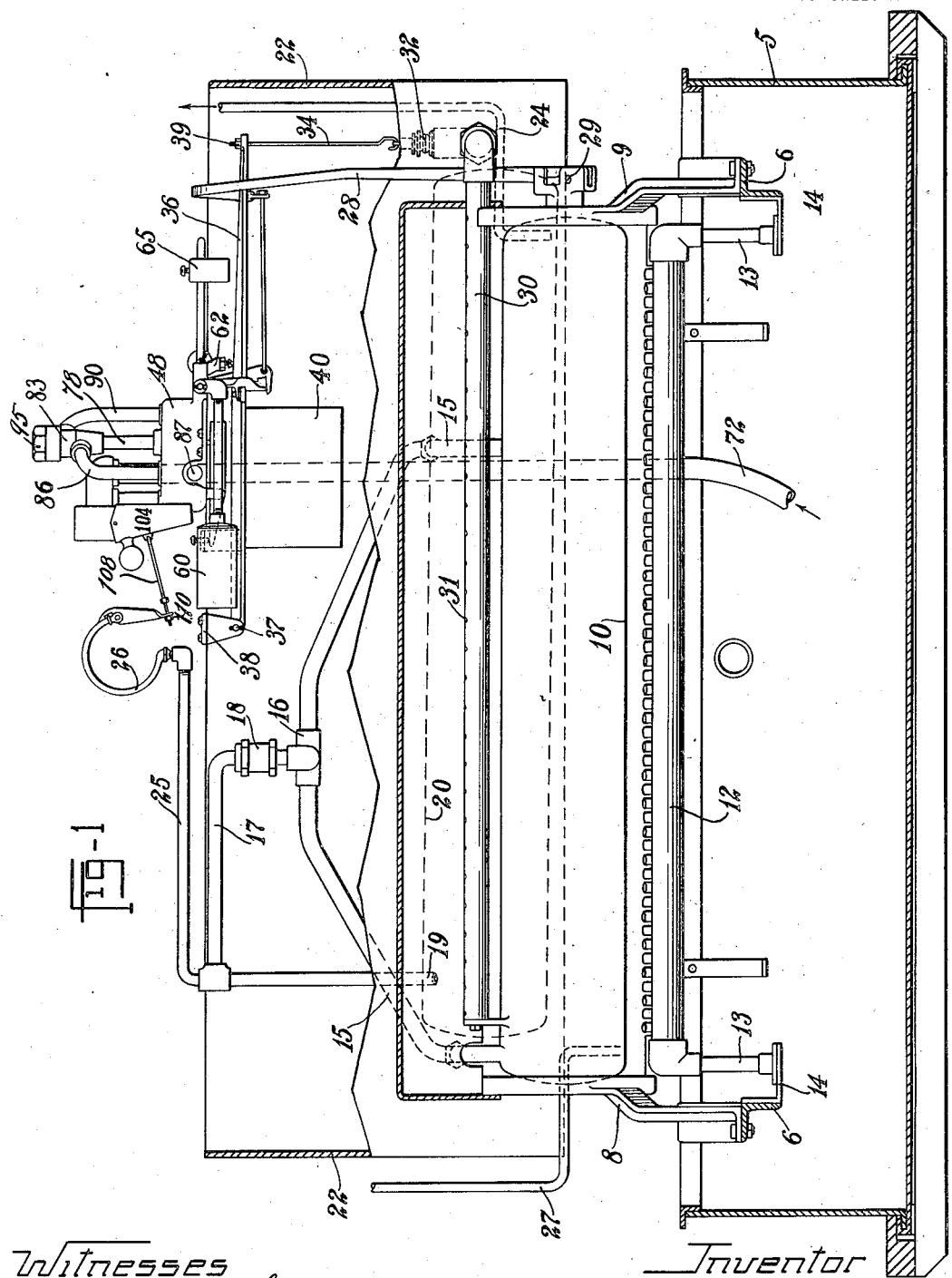

UNITED STATES PATENT OFFICE.

HARRISON H. SOUTHWORTH, OF CLEVELAND, OHIO, ASSIGNOR, BY MESNE ASSIGNMENTS, TO THE ICELESS MACHINE COMPANY, OF CLEVELAND, OHIO, A CORPORATION OF OHIO.

CONTROLLING DEVICE FOR REFRIGERATING APPARATUS.

1,162,318.  Specification of Letters Patent.  Patented Nov. 30, 1915.

Application filed June 11, 1914. Serial No. 844,598.

*To all whom it may concern:*

Be it known that I, HARRISON H. SOUTHWORTH, a citizen of the United States, residing at Cleveland, in the county of Cuyahoga and State of Ohio, have invented a certain new and useful Improvement in Controlling Devices for Refrigerating Apparatus, of which the following is a full, clear, and exact description, reference being had to the accompanying drawings.

This invention relates to controlling devices for controlling the supply of cooling and heating media in a refrigerating apparatus of the generator-absorber type, such for example, as is shown, described and claimed in my application No. 837,118, filed May 8, 1914. In such apparatus there is provided a generator-absorber and a condenser for the anhydrous ammonia driven off from the generator-absorber, which acts alternately as a generator and an absorber, being heated by fuel gas controlled by a valve forming part of the controlling device and alternately cooled by water operating in connection with the valve. The controlling device acts to reverse the cycle of operation from generation to absorption, by shutting off the gas and turning on the water, and vice versa, and is dependent for its operation on the conditions existing in the generator-absorber and in the condenser.

The object of the invention is to provide such a device which shall be simple and efficient in operation and which may be comparatively cheaply manufactured.

Another object is to so arrange the device that the desired change in the conditions in the condenser may act positively to invariably reverse the cycle.

A more specific object is to provide a relay device in the connections between the mechanism for changing the cycle and a device operated by the conditions in the condenser, to insure the positive action above mentioned.

Other objects will become apparent in the following description of my invention in connection with the drawings and the essential characteristics are hereinafter set forth in the claims.

In the drawings Figure 1 is a side elevation partly in section of a refrigerating apparatus such as shown and described in the application above referred to, showing my controlling device operatively connected therewith; Fig. 2 is a vertical sectional view on a somewhat enlarged scale through the parts of my controlling device and through the water controlled gas regulating valve; Fig. 3 is a plan of the parts shown in Fig. 2.

Referring to the parts by reference numerals, an overflow water tank, indicated at 5, is provided, with cross members 6 on which are mounted brackets 8 and 9, supporting at their ends an elongated tank 10, which forms the generator-absorber of the refrigerating apparatus. Beneath this generator-absorber is provided a burner pipe 12, having downwardly turned ends 13 resting on brackets 14 secured to the cross members 6 and opening downwardly to admit the water in the tank 5, which seals the ends of the burner, at the same time permitting water flowing over the still and dropping onto the burner to be discharged through these end pipes. Such a burner is shown, described and claimed in my application No. 837,117, filed May. 8, 1914. Leading upwardly from the generator-absorber, are two pipes 15, meeting in a T connection 16 from which a pipe 17 leads through a check valve 18 and then downwardly, as at 19, to a suitable condenser tank 20. The condenser tank is mounted in a rectangular tank 22 adapted to contain water for cooling the condenser. A pipe 24 leads from the condenser to the expansion coils in the brine tank of the refrigerator proper, thence back to the generator-absorber as indicated at 27. Leading from the pipe 17 and in direct communication with the condenser, is a pipe 25 carrying a pressure operated device 26, which, as shown, is a Bourdon spring tube adapted at certain predetermined pressures to operate my controlling device, to be hereinafter described. Within the generator-absorber, is provided a thermostatic rod acting on a lever 28 pivoted at 29 and extending upwardly and then downwardly into the tank 22 and also connected with the controlling device. These parts and a number of the parts of the controlling device, are shown, described and claimed in my application on a refrigerating apparatus, filed May 8, 1914, but are herein referred to for clearness.

From within the tank 22, leads a pipe 30, suitably mounted above the generator-absorber and provided with openings 31 through which water from the tank 22 may flow, over the generator-absorber, to cool the same during the period of absorption. The flow of water through this pipe is controlled by a suitable valve 32 attached to a link hook 34, extending loosely through the end of a lever 36 pivoted at 37 on a bridge member 38, extending across the top of the tank 22. The link hook 34 is provided with a nut 39, which the lever engages on its upward movement to raise the valve 32.

Mounted on the lever 36, is a float 40 comprising a downwardly opening cup-shaped member secured to the under side of the lever. The lever 36 is provided with laterally extending lugs 41 and 42, adapted to be engaged by latch hooks 43 and 44 respectively, mounted on a rock shaft 45 journaled in the ears 46, extending downwardly from the water controlled gas valve casing 48. This casing is mounted on a cross member 50 carried by the tank 22. The latch 43 is provided with a shoulder 52 adapted to engage the ear 41 to hold the lever and float in its upper position, and this latch is connected to a link 53 extending loosely through an eye formed in the end of the lever 28 and having nuts 54 thereon, against which the end of this lever abuts, when moved by the thermostat within the generator-absorber, to withdraw the latch and allow the float to drop. The latch 44 is provided with a shoulder 56 adapted to engage the ear 42 to hold the lever and float in its lower position, against the buoying action of the water in the tank 22. Each of these latch hooks is provided with counterweights 57, causing them to normally engage the corresponding ears on the lever 36. To disengage the latch 44, I have provided an upwardly opening cup 60, carried on a rod 61, acting through a finger 62, on the hub 63, extending beneath the weight 57. This cup may be filled with water, to cause it to drop and rise and to operate the latch, as is hereinafter described, and is counterweighted by an adjustable weight 65 on a rod 66 rigid with the hub 63, which acts to hold the cup in its upper position when empty.

At one side of the valve casing 48, is formed a tubular portion 67, in communication with the interior of the casing at the bottom, opening upwardly and fitted with a short pipe 68, connected at its upper end with a chamber head 70. This head is connected with a pipe 71, leading from the supply pipe 72 through which water is brought to the controlling device and refrigerating apparatus. The head 70 is oblong, the pipe 71, being connected therewith at one end, and at its other end it is provided with a T-passage 74, opening downwardly and upwardly. It will be seen that water flowing through the supply pipes to the head 71, will first fill the pipes 68 and flow into the valve chamber and will flow slowly therefrom through a small opening 75 in the bottom of the valve casing. The volume of the water flowing to the head is much greater than will flow through this opening 75, accordingly the greater portion of the water will overflow through the downwardly opening portion of the T-passage.

Within the casing 48, is provided a float 76, rigidly carried by a valve stem rod 77, slidably extending through the bottom of the casing and extending upwardly through a tube 78 of larger diameter than the rod, leaving a passage and having at its upper end a suitable valve head 80. At the upper end of the tube 78, is provided a suitable valve seat, which as shown, is formed by flaring the ends of the tube 78 at 81. Carried on the upper end of this tube is a valve head 83, having a threaded opening at its upper end, closed by a plug 85, and to which leads a pipe 86, connected to the gas supply pipe 87, through which gas is supplied to a chamber 88 formed within the valve head. It will be seen that the head of water in the tubes 67 and 68, will tend to buoy the float 76 upwardly and raise the valve 80, from its seat, allowing the passage of gas therethrough. The pressure of the gas acting downwardly on the water surrounding the float 76, through the tube 78, tends to move the float downwardly, whereby an excessive pressure of gas will cause the valve to partially or entirely close, thereby providing an automatic regulation. The pipe 86 preferably leads to the under side of the valve head, to best insure the closing under excessive pressure.

Above the valve seat is provided a suitable exit opening, communicating with a pipe 90 in communication with a pipe 91, leading to the burner 12. When the valve is raised from its seat, the gas will pass from the gas supply pipes through the valve and through the pipes 90 and 91 to the burner. The upward movement of the valve may be limited by a suitable adjusting screw 94, threaded through the plug 85. As shown, a cap 95 is threaded onto the upper portion of the plug 85 and abuts the upper end of the valve head, covering the same and locking it in position.

When in operation, my apparatus is constantly supplied with water through the pipes 72 and 71, as described, the greater portion of which overflows from the head 70 into the tank 22. During the period of generation, when the ammonia gas is being driven off from the generator 10, it is condensed by means of the cooling water within this tank, which may overflow through a suitable pipe, not shown, to the tank 5. During this period of generation, the water being supplied to the valve casing, as described, acts on the float 76 to keep the valve open, thereby supplying the burner with gas. At the end of this period, which is determined by the proper amount of ammonia being driven off from the generator, which occurs when the liquid within the generator has risen to a certain temperature, this temperature causes the thermostat to act on the lever 28, thereby moving the same to the right. The water within the tank acts upwardly on the float 40, which has been latched down by the shoulder 56, engaging the lug 41. The movement of the lever 28 to the right, draws the latch 44 out of engagement with this lug and allows the float to rise, opening the valve 32, allowing the water to flow over the still. At the same time, the valve 80 is closed, shutting off the gas to the burner by means of a lever 96, pivoted at 97 to ears carried by the casing 48 and having weighted portions 98 which act on a collar 99 on the valve stem 77, to draw the valve stem downwardly against the buoying action of the float.

The weighted portion of the lever 96 stands adjacent the bottom of the casing 48, during the period of generation just described, being counter-balanced and held upwardly by a yoke 100 on the other arm 101 on the lever 96, connecting it with the lever 36. As shown, the weight 100 stands over the lever 36, and when the float moves upwardly as described, this weight is raised, allowing the weighted portion 98 to bear downwardly on the collar 99, closing the valve as described.

At 104, is indicated a chute, preferably contracted at its lower end, having its upper edge pivoted at 105 on each side of the T portion 74 of the head 70, and being provided with a weight 106 tending normally to swing the lower end to the right, directing the water overflow through this chute into the tank 22, just at one side of the cup 60. This chute is connected to the Bourdon spring tube by a link 108, hooked through an ear 109 on the chute and having a threaded portion on which is provided a nut 110. The end of a lever 112, is provided with a suitable eye loosely slidable over the link and connected at its upper end with the Bourdon spring tube. As shown, this lever is attached to the Bourdon spring by a pin 114, extending through a suitable eye, formed on the end of the spring and the lever is provided with a finger 115 extending upwardly and engaging the side of the spring tube, causing the lever to act positively when pulling the rod in the left hand direction, as the spring contracts. When the pressure within the spring, which tended to straighten it, is sufficiently lowered, the tube contracts, causing the lever 112 to engage the nut 110 to swing the lower end of the chute to the left, directing the water overflowing from the head 70 into the cup 60, which provides considerable weight on the lever arm 61, causing the cup to drop, and through the finger 62, swing the latch 44 to the left.

When the float moves upwardly at the end of the generation period, the lug 41 engages a projecting finger 117 on the latch 44, limiting the upward movement of the lever and float, and, as the water is lowered away from the float, releasing the upward pressure, the counterweight 57 of the latch 44 moves the latch inwardly bringing the shoulder 52 beneath the lug 41, thereby latching the float in this upper position.

The weight of the lever arm, float, valve 32 and weight 100, is all supported by the shoulder 52, and considerable force is required to move the latch outwardly to release the same. This force is too great for any pressure device which may be conveniently used in connection with the condenser, but by providing the relay mechanism between the pressure device and the latch, I may use any convenient form of pressure device sufficiently strong to swing the chute, thereby operating this latch by the weight of water in the cup 60, providing ample force for operating the latch.

The mechanism described acts in connection with the refrigerating apparatus as follows: At the end of the period of generation, the gas is shut off, float moved upwardly and there latched, the water within the tank 22 allowed to flow over the absorber and the parts remain in the position shown in the drawings, but at the end of the period of absorption, during which the generator is cooled by the water from the tank 22, the liquid therein acting to absorb ammonia gas from the refrigerating coils, the pressure in the condenser suddenly drops when all of the anhydrous ammonia is exhausted from the condenser. This allows the Bourdon spring to contract, drawing the chute to the position indicated in dot and dash lines, directing water into the cup 60, which when sufficiently filled, drops, releasing the float as described. This acts to close the valve 32, and raises the weight through the yoke 100, which permits the valve to again be raised and opened, permitting the flow of gas to the burner. When the float drops, its downward movement is limited by a finger 118 on the latch 44, and as its weight is sufficiently relieved from this finger by the buoying action of water in the tank 22, the weight 57 of the latch 44 moves the latch inwardly to cause the shoulder 56 to engage the ear 42, thereby holding the float and the other parts, in the positions described for the generating period. The cup 60 is provided with openings 119 in the bottom, to permit the water to drain therefrom.

It will be seen from the foregoing description that I have provided a controlling device accomplishing the objects above set forth, which may be cheaply manufactured and which has no parts liable to get out of order.

Having thus described my invention, what I claim is:

1. In a refrigerating apparatus, the combination with generating and absorbing means, of means for terminating the absorption period, a power device for controlling said means, a secondary power device for controlling the power device first mentioned, and mechanism for controlling the secondary power device.

2. In a refrigerating apparatus, the combination with generating and absorbing means and a condenser, of a power device for terminating the absorption period, means for holding said power device idle, secondary power mechanism for rendering the power device active, and means responsive to the fluid pressure in the condenser for operating the secondary power device.

3. In a refrigerator apparatus, the combination with generating and absorbing means and a condensor, of means for effecting the succession of operations, a controlling device therefor, a source of liquid supply, a receptacle, a controlling device dependent for its operation on the pressure in the condenser, and means operated thereby for directing the fluid into such receptacle to furnish power for operating the first mentioned controlling device.

4. In a refrigerating apparatus, the combination with generating and absorbing means, of power mechanism for effecting a succession of operations, controlling means therefor for terminating the generating period and starting the absorption period, and controlling means for terminating the absorption period and starting the generating period, said latter controlling means including a pressure responsive device and a relay between it and the power means.

5. In a refrigerator apparatus of the generator-absorber type, the combination of power means for reversing the generating and absorbing operations, a condenser, a source of liquid supply, a receptacle, a pressure device in communication with the condenser, means operated by the pressure device for directing liquid into such receptacle, and means whereby the weight of liquid therein may control the power means for reversing the cycle.

6. In a refrigerating apparatus of the generator-absorber type, the combination of a source of fuel gas supply and a source of water supply, a valve controlling the fuel gas supply, a second valve, a lever for operating said second valve, a latch for holding the lever in one position, means for releasing said latch including a receptacle, means for directing water into said receptacle, and a pressure device connected with said directing means whereby water is added to the receptacle when the pressure device is operated to release the latch.

7. In a refrigerating apparatus of the generator-absorber type, the combination with a generator-absorber and means for alternately heating and cooling such generator-absorber comprising a gas supply and a water supply, means for directing the water over the generator-absorber, means for closing off the gas, a movable receptacle operating said means, a pressure device, and means connected with the pressure device for directing the water into said receptacle whereby its weight may operate the means controlling the gas and water valves.

8. In a refrigerating apparatus of the generator-absorber type, the combination with a still and a condenser, of means for alternately heating and cooling the still comprising a supply for fuel gas and a supply for water, valves controlling such supplies, mechanism controlling the water valve, a latch for said mechanism, a receptacle connected with said latch, and means dependent for its operation on the conditions in the refrigerating system for directing water into said receptacle to operate the latch.

9. In a refrigerating apparatus of the generator-absorber type, the combination with means for reversing the generating and absorbing operations including a movable device, of means for latching the said device in either of two positions, means for releasing the latching means at the end of one period of the cycle, means for operating the latch to release said device from its other position at the end of the other period, and a power relay in said last mentioned means whereby a comparatively light force may control a much greater force for operating said means.

10. In a refrigerating apparatus of the generator-absorber type, the combination with controlling means for reversing generating and absorbing operations including a lever, means for latching the lever in either of two positions, means for releasing the latching means at the end of one period of the cycle, means for operating the latch to release the lever from its other position at the end of the other period, a power relay in said last mentioned means whereby a comparatively light force may control a much greater force for operating said means, and a pressure device operated by pressure fluid in the apparatus to provide the light force.

11. In a refrigerating apparatus of the generator-absorber type, the combination with a source of fuel gas supply, a source of water supply controlling the fuel supply, a controlling device dependent for its operation on conditions in the refrigerating system, a movable receptacle, means connected with said receptacle for operating said valve, and means operated by said controlling device for directing water into said receptacle to cause the operation of the valve.

12. In a refrigerating apparatus of the generator-absorber type, the combination with a source of fuel gas supply and a source of water supply, of means for controlling the fuel gas and water to reverse the generating and absorbing operations of the apparatus, a pressure device, means for operating said controlling means comprising a movable receptacle, and a chute operated by the pressure device for directing water into said receptacle to add weight thereto.

13. In a refrigerating apparatus, the combination with means for controlling the supply of heating and cooling media, of a receptacle adapted to be lowered when weight is added thereto to operate said controlling device, a pivoted chute through which the cooling media flows, and means dependent for its operation on the conditions in the apparatus for directing the cooling media into said receptacle.

14. In a refrigerating apparatus of the generator-absorber type, the combination of a generator-absorber condenser, a source of fuel gas supply and a source of water supply, a tank, means for directing fluid from said tank over the generator-absorber, means for shutting off the supply of gas including a float acting alternately as a weight and a float, a latch for holding the float in its down position, a latch for holding it in its up position, a substantially cup-shaped receptacle acting by weight to release one of said latches, a pressure device operated by the pressure of fluid in the apparatus, and a chute controlling the flow of water operated by said pressure device to direct water into the cup to release said latch.

15. In a refrigerating apparatus of the generator-absorber type, the combination with a generator-absorber, of a condenser, a tank for water about the condenser, a source of water supply and a source of fuel gas supply for heating the generator-absorber, a valve controlling the fuel gas supply, a valve controlled means for directing the water in the tank over the generator-absorber, a float member acting alternately as a float and a weight, means connecting the float member with both of said valves, a latch for holding the float in its down position, a latch for holding the float member in its up position, a pressure device connected with the condenser, a substantially vertically movable receptacle for operating one of said latches, a pivoted chute connected with the pressure device through which the water flows whereby the operation of the pressure device may direct water into the said receptacle to operate the latch.

16. In an absorption refrigeration apparatus, the combination with absorbing means and a receptacle for liquid refrigerant, of a device adapted to have a movement resulting from the dropping of pressure in the receptacle consequent upon the exhaustion of liquid refrigerant therein, power operated means for terminating the absorption period, and relay mechanism controlled by said device and controlling said power operated means.

17. In an apparatus of the character described, the combination, with generating and absorbing means, of a condenser, means for supplying cooling medium thereto, means for controlling the application of such supply to the refrigerating medium including a device having a movement dependent upon pressure conditions in the condenser, a power device operating to terminate the absorption period, and relay mechanism for controlling said power device and itself operated by the device first mentioned.

18. In an absorption refrigeration apparatus, the combination with a stationary receptacle for liquid refrigerant and an absorber, of means for supplying a cooling medium to the absorber, power means for terminating the absorption period, a power device for controlling said power means, and a controlling device for said power device dependent on the exhaustion of liquid refrigerant from its receptacle.

19. In an absorption refrigeration apparatus, the combination with a receptacle for liquid refrigerant and an absorber, of means for supplying a cooling medium to the absorber, a device for terminating the absorption period adapted to be operated by water power, and means for controlling the supply of water to such device, said controlling means being operated by the pressure conditions in said receptacle.

20. In a refrigerating apparatus, the combination, with a liquid refrigerant receptacle and an absorber, of means for supplying cooling water to the absorber, a water operated device for shutting off said supply, a pressure device connected with the receptacle, and means controlled by the pressure device for directing water to the water-operated device.

21. In a refrigerating apparatus, the combination with a condenser and an absorber, means for supplying water to the absorber, water-operated means adapted to shut off such supply, a movable chute adapted to direct water to said means, and a Bourdon spring in communication with the condenser and connected with said chute.

22. In a refrigeration apparatus of the absorption type, the combination with a generator-absorber and a condenser, of means for alternately supplying heat and cooling water to the generator-absorber, automatic means for shutting off such heat and turning on such water, water-controlled means for turning off the water and turning on the heat, a movable conduit for controlling the passage of water to said water-operated means, and a pressure responsive device in communication with the condenser and connected with said movable conduit.

23. In a refrigeration apparatus, the combination with generating and absorbing means, of a power device for effecting the reversals of operation, means acting directly on said power device to terminate the generation period, and means acting indirectly on the power device to terminate the absorption period, the last mentioned means comprising a controlling device and power mechanism controlled thereby and itself controlling the said power device.

24. The combination, with generating and absorbing means and a condenser, of a thermostat in the generator, a pressure responsive device connected with the condenser, power means for effecting the reversals of operation, mechanism operated directly by the thermostat for controlling the power means at the end of the generation period, and mechanism for controlling the power means at the end of the absorption period operated by the pressure responsive device through an intermediate power relay.

In testimony whereof, I hereunto affix my signature in the presence of two witnesses.

HARRISON H. SOUTHWORTH.

Witnesses:
　ALBERT H. BATES,
　JUSTIN W. MACKLIN.